United States Patent [19]

Priddy et al.

[11] Patent Number: 4,895,907

[45] Date of Patent: Jan. 23, 1990

[54] POLYMERIZATION PROCESS USING BISQUINONE PEROXIDE CATALYST

[75] Inventors: Duane B. Priddy, Midland, Mich.; Mehmet Demirors, Terneuzen, Netherlands

[73] Assignee: The Dow Chemical Company, Midland, Mich.

[21] Appl. No.: 232,187

[22] Filed: Aug. 15, 1988

[51] Int. Cl.[4] .................... C08F 4/34; C08F 279/02; C08F 291/02
[52] U.S. Cl. .................... 525/257; 525/273; 524/340; 526/208; 526/232.5
[58] Field of Search ............ 525/273, 243, 387, 257; 568/567, 558, 559, 573; 524/360; 526/208, 232.5

[56] References Cited

U.S. PATENT DOCUMENTS 4,054,615  10/1977  Hardt et al. ..................... 525/290

OTHER PUBLICATIONS

Chem. Abst. 87 (6): 39905v, Ryabov, A. V., Polymerization of Styrene . . . (1976) (USSR).

Primary Examiner—Wilbert J. Briggs, Sr.

[57] ABSTRACT

An improved free radical polymerization process employing as a polymerization initiator a bisquinone peroxide. Upon decomposition to initiate polymerization such bisquinone peroxides may also produce singlet oxygen capable of producing hydroperoxidized rubber if rubber is included in the polymerization mixture. The by-products formed from the decomposition of the bisquinone peroxide desirably comprise hindered phenolic compounds having antioxidant properties.

8 Claims, No Drawings

POLYMERIZATION PROCESS USING BISQUINONE PEROXIDE CATALYST

BACKGROUND OF THE INVENTION

The present invention relates to a process for the preparation of polymers. In a further embodiment the present invention relates to a process for preparing grafted derivatives of rubbery spine polymers. The processes of the invention utilize bisquinone peroxides that decompose to produce beneficial phenolic derivatives. Moreover the use of the present bisquinone peroxides achieves improved grafting efficiency in the preparation of graft polymers.

It is previously known in the art to obtain grafted rubbery polymers by polymerizing graft forming polymerizable monomers in the presence of a rubbery spine polymer. The use of rubbery spine polymers comprising in polymerized form conjugated dienes proceeds relatively easily even in the absence of graft promoting additives. The presence of a peroxide free radical initiator is often employed to obtain the polymerization of free radically polymerizable monomers. However, in the use of certain other rubbery spine polymers particularly such polymers that are substantially devoid of ethylenic unsaturation such as alkyl acrylate based rubbery polymers and copolymers of ethylene propylene and optionally a nonconjugated diene (EPDM) rubbers, the grafting efficiency is greatly reduced.

It is previously known in the art to use singlet oxygen generated in situ to promote grafting of graft forming polymerizable monomers onto rubbery spine polymers. Examples of such techniques are contained in U.S. Pat. Nos. 3,484,353, 3,846,266, and 4,717,741. In these references singlet oxygen is photochemically generated and contacted with the rubbery spine polymer prior to contacting the rubbery spine polymer with the graft forming polymerizable mixture. The singlet oxygen generated in situ according to the disclosures of the above referenced patents acts as a graft promoting additive in the polymerization to induce graft formation between the rubbery spine polymer and the matrix polymer. Disadvantageously these methods have involved cumbersome reaction conditions to photogenerate the oxygen in situ. Also such techniques generally employed a photosensitizer, which if not removed from the resulting product, may adversely affect the weatherability and UV light resistance of the resulting polymer.

It is additionally previously known in the art to utilize aliphatic and aromatic peroxide compounds as free radial initiators in polymerization processes. Generally upon heating such peroxides cleave at the oxygen-oxygen bond to form two alkoxy radicals that initiate the free radical polymerization process. Disadvantageously, such free radical forming initiators are generally less effective in obtaining graft polymerization in highly saturated rubber formulations, for example in the preparation of polymers containing the aforementioned EPDM or acrylate rubbers, than in formulations containing conjugated diene based rubbers such as polybutadiene.

Modern thermoplastic resins for use as molding resins often incorporate additives to prevent polymer degradation. Particularly useful are antioxidants such as hindered phenolic compounds, which are usually added in small amounts before or after polymerization. It would be desirable if it were possible to provide a polymerization initiator the decomposition products of which impart improved polymer properties. It would be particularly desirable to provide a polymerization initiator the decomposition products of which comprise a hindered phenolic compound.

It would be desirable if there were also provided an improved process particularly adapted for preparing graft interpolymers of rubbery spine polymers providing improved grafting efficency.

SUMMARY OF THE INVENTION

According to the present invention there is now provided a free radical polymerization process wherein the polymerization initiator comprises a bisquinone peroxide corresponding to the formula:

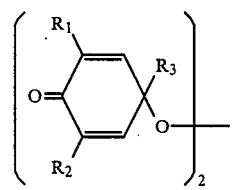

I wherein $R_1$, $R_2$ and $R_3$ independently each occurrence are noninterfering chemical substituents.

Additionally, according to the present invention there is now provided a process for preparing graft polymers by polymerizing a graft forming polymerizable mixture in the presence of a rubbery spine polymer and a graft promoting amount of a bisquinone peroxide corresponding to the formula:

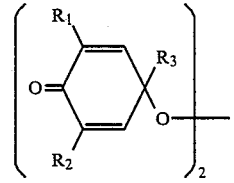

I wherein $R_1$, $R_2$ and $R_3$ independently each occurrence are noninterfering chemical substituents.

The processes of the present invention have been found to be uniquely beneficial in that the bisquinone peroxides required by the above processes cleave at the carbon to oxygen bond to yield singlet oxygen plus a phenoxy free radical which upon extraction of a hydrogen during polymerization initiation or from a chain transfer agent or other source results in a remnant that is a phenolic derivative. In a preferred embodiment such phenolic derivatives possess antioxidant properties resulting in a self stabilized polymerization product.

DETAILED DESCRIPTION OF THE INVENTION

The use of the above-specified bisquinone peroxides according to the present invention to yield singlet oxygen and free radicals, the remnants of which comprise phenolic antioxidants, results in processes of unique benefit. Preferred bisquinone peroxides are those wherein $R_1$ and $R_2$ independently each occurence are selected from the group consisting of alkyl, cycloalkyl and aryl groups having from 4 to 20 carbons and $R_3$ is selected from the group consisting of aryl, alkoxy, aryloxy, cycloalkoxy, alkylsulfide, arylsulfide and cycloalkylsulfide moieties having 1 to 12 carbons. In a most preferred embodiment $R_1$ and $R_2$ are selected from the group consisting of $C_4$-$C_{10}$ branched alkyl and $R_3$ is selected from the group consisting of $C_{1-6}$ alkoxy and phenoxy.

In schematic representation the decomposition of the bisquinone peroxides according to the present invention may be represented as follows:

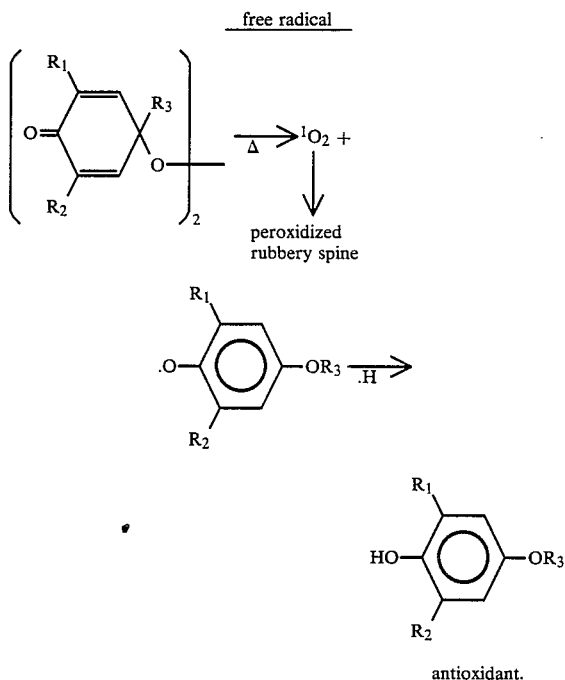

The cleaving occurs at normal polymerization temperatures on the order of about 50° C. to about 150° C. The decomposition of the bisquinone peroxide occurs in situ under the conditions of the polymerization reaction. Additional additives (i.e. solvent, additional antioxidants, plasticizers, lubricants, chain transfer agents, etc.); the rubbery spine polymer; and free radically polymerizable matrix monomers may all be combined with the bisquinone peroxide prior to the polymerization and/or graft forming process. The amount of bisquinone peroxide employed may be varied over wide limits. Preferably, amounts from 0.01 weight percent to 5 weight percent, most preferrably from 0.1 to 1.0 weight percent based on total rubber and monomer weights are employed.

While any suitable free radical forming polymer may be formed utilizing the bisquinone peroxides according to the present invention, preferred monomers are monovinylidene monomers and mixtures thereof with copolymerizable comonomers. Examples of suitable monovinylidene monomers include monovinylidene aromatic compounds such as styrene, alpha-methyl styrene, and ring alkyl substituted derivatives of styrene; methylmethacrylate, and other alkyl methacrylates; acrylonitrile or methacrylonitrile; halogenated vinyl compounds such as vinyl chloride; etc. Examples of suitable copolymerizable comonomers include anhydrides, especially maleic anhydride, N-substituted maleimides particularly N-phenylmaleimide; N-ethylmaleimide, N-t-butylmaleimide, etc.

The rubbery spine polymer suitably employed according to one embodiment of the present invention may be any rubbery spine polymer capable of graft polymer formation. Examples include the well known homopolymers of conjugated dienes and interpolymers thereof with copolymerizable comonomers; also hydrogenated derivatives of the foregoing. Examples of copolymerizable comonomers include acrylonitrile, styrene, methylmethacrylate, etc. Additional suitable rubbery spine polymers include EPDM polymers especially interpolymers of ethylene, propylene and a copolymerizable nonconjugated diene, especially one selected from the group consisting of 1,4-hexadiene, dicyclopentadiene, and ethylidene norbornene. Further suitable spine polymers include rubbery unsaturated graftable polymers of $C_{4-8}$ alkyl acrylates and interpolymers thereof with copolymerizable comonomers. Especially suited are homopolymers of butyl acrylate and copolymers thereof with a monovinyl monomer.

The bisquinone peroxides are prepared by the addition of oxygen to appropriately substituted phenols. The addition may be accomplished in the presence of potassium ferric cyanide or other suitable oxidizing compound. The technique has been previously disclosed in the Journal of the American Chemical Society, 78, 2002 (1956).

The graft promoting additive may be incorporated in any polymerization process as a free radical generator and is particularly suitable for use in polymerization processes incorporating a rubbery additive. Preferred polymerizations are bulk or solution grafting polymerizations. Suitable processes include the well known continuous or batch processes involving stirred tubes, back mixed or other suitable reactors. After initial graft formulation, the reaction may be discontinued and the products added to water before further polymerization according to known techniques of suspension polymerization if desired.

Although formation of singlet oxygen is highly desired according to the present operation for a graft polymerization process, it is recognized that the present bisquinone peroxides may additionally be employed in a free radical polymerization in the absence of a rubbery spine polymer.

The polymers and graft polymers formed by the invention are desirably employed as molding resins and may be blended with additional additives such as pigments, lubricants, heat stabilizers, etc. as well as other polymers including rubbery polymers (both natural and synthetic), additional matrix polymer of the same composition as the grafted phase and additional matrix polymers different from the grafted phase, i.e. polyphenylene oxides, polycarbonate, polyvinyl chloride, etc. Having described the invention the following examples are provided as further illustrative and are not to be construed as limiting.

EXAMPLE 1

Preparation of Bis 4,4'-(2,6-di-t-butyl-4-methoxyquinone)Peroxide

To an Erlymeyer flask was added 20 grams each of potassium carbonate and potassium ferricyanide followed by 100 ml each of water and benzene. 4-Methoxy-2,6-di-t-butylphenol (0.01 moles) was added to the stirred solution. After stirring overnight, the organic layer was separated and evaporated to an oil which was crystallized from ethanol to give yellow crystals. Infrared, H-NMR, and polarographic analysis all confirmed that the crystals were the desired bis 4,4'-(2,6-di-t-butyl-4-methoxyquinone)peroxide (BMQP).

EXAMPLE 2

Thermal Decomposition of BMQP

A solution of BMQP (1% by weight) in 2,3-dimethyl-2-butene was sealed in a glass ampoule under nitrogen. The ampoule was heated at 140° C. for 1 hour. Gas chromatography/mass spectroscopic analysis of the resulting mixture showed that the main products formed from the dimethylbutene were 2,3-dimethyl-1-butene-3-ol and 2,3-dimethyl-2-butene oxide. These two products could only have formed via the well known "ENE Reaction" which clearly demonstrates that the thermal decomposition of BMQP liberates oxygen in the highly reactive singlet state.

EXAMPLE 3

Styrene Polymerization

A solution of styrene and BMQP (0.5% by weight) was sealed in a glass ampoule and heated to 120° C. for 4.5 hours. The contents of the ampoule were then diluted with methylene chloride and mixed with methanol. The precipitated polymer was dried and analyzed using size exclusion chromotography and UV spectroscopy. The resulting polystyrene has a molecular weight of 100,000 as determined by size exclusion chromatography using polystyrene standards. Analysis of the product by liquid chromatography confirmed th presence of 2,6-ditertiarybutyl-4-phenoxyphenol antioxidant.

In the absence of BMQP the amount of polystyrene produced utilizing reaction conditions otherwise the same as those employed herein was considerably less. Moreover the resulting polystyrene had a molecular weight of 427,000 indicating substantially less polymer initiation had occurred.

EXAMPLE 4

Graft Polymer Formation

The conditions of Example 3 are substantially repeated employing a mixture of styrene containing 5% by weight EPDM polymer. The rubber was an interpolymer of ethylene, propylene and ethylidene norbornene (Royalene TM 505 available from Uniroyal Chemical Company Inc.). After polymerization at 120° C. for 4.5 hours the resulting composition was shown to contain graft polymer formation as evidenced by infrared analysis of the rubber phase.

In the absence of BMQP the amount of grafted polystyrene in the rubber phase was found to be considerably reduced. This result indicates that the formation of singlet oxygen according to the technique of the present invention improves grafting efficiency in a graft polymerization process.

What is claimed is:

1. A process for preparing graft polymers comprising polymerizing a graft forming polymerizable mixture in the presence of a rubbery spine polymer and a graft promoting amount of a bisquinone peroxide corresponding to the formula:

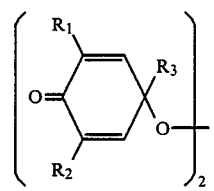

wherein $R_1$, $R_2$ and $R_3$ independently each occurrence are noninterfering chemical substituents, and wherein the bisquinone peroxide cleaves at the carbon-oxygen bond.

2. A process for preparing graft polymers comprising polymerizing a graft forming polymerizable mixture in the presence of a rubbery spine polymer and a graft promoting amount of a bisquinone peroxide corresponding to the formula:

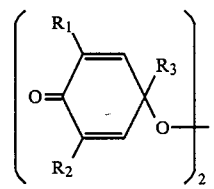

wherein $R_1$, and $R_2$ independently each occurrence are selected from the group consisting of alkyl, cycloalkyl and aryl groups having from 4 to 20 carbons and $R_3$ is selected from the group consisting of aryl, alkoxy, aryloxy, cycloalkoxy, alkylsulfide, arylsulfide and cycloalkylsulfide moieties having 1 to 12 carbons.

3. A process according to claim 1 wherein the bisquinone peroxide is bis 4,4'-(2,2-di-t-butyl-4-methoxy quinone)peroxide.

4. A process according to claim 1 wherein the rubbery spine polymer comprises an interpolymer of ethylene, propylene and a nonconjugated diene and the graft forming polymerizable mixture comprises styrene and acrylonitrile.

5. A free radical polymerization process comprising contacting a free radically polymerizable monomer with a polymerization initiating quantity of a bisquinone peroxide corresponding to the formula:

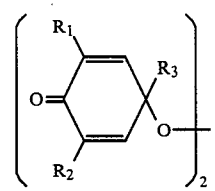

wherein $R_1$, $R_2$ and $R_3$ independently each occurrence are noninterfering chemical substituents, and wherein the bisquinone peroxide cleaves at the carbon-oxygen bond.

6. A free radical radical polymerization process comprising contacting a free radically polymerizable monomer with a polymerization initiating quantity of a bisquinone peroxide corresponding to the formula:

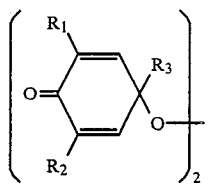

wherein $R_1$ and $R_2$ independently each occurrence are selected from the group consisting of alkyl, cycloalkyl and aryl groups having from 4 to 20 carbons and $R_3$ is selected from the group consisting of aryl, alkoxy, aryloxy, cycloalkoxy, alkylsulfide, arylsulfide and cycloalkylsulfide moieties having 1 to 12 carbons.

7. A process according to claim 5 wherein $R_1$ and $R_2$ independently each occurrence are $C_4$–$C_8$ branched alkyl and $R_3$ is $C_1$–$C_6$ alkoxy or phenoxy.

8. A process according to claim 5 wherein the bisquinone peroxide is bis(2,2-di-t-butyl-4-methoxy quinone)-peroxide.

* * * * *